United States Patent [19]

Adams, Sr. et al.

[11] 4,003,532
[45] Jan. 18, 1977

[54] HEADING HOLD LOGIC

[75] Inventors: Don L. Adams, Sr., Fairfield; Raymond G. Johnson, Jr., Milford, both of Conn.

[73] Assignee: United Technologies Corporation, Hartford, Conn.

[22] Filed: Mar. 15, 1976

[21] Appl. No.: 666,590

[52] U.S. Cl. .......................... 244/17.13; 244/178; 244/196

[51] Int. Cl.² .................. B64C 11/34; G05D 1/08

[58] Field of Search .............. 244/17.13, 178, 180, 244/196, 197, 83 E, 83 G, 184, 189, 175, 182, 181, 185; 318/584

[56] References Cited

UNITED STATES PATENTS

| | | | |
|---|---|---|---|
| 2,733,878 | 2/1956 | Ciscel | 244/17.13 |
| 2,845,623 | 7/1958 | Iddings | 244/185 |
| 3,711,042 | 1/1973 | Rempfer | 244/182 |
| 3,920,966 | 11/1975 | Knemeyer | 244/182 |

*Primary Examiner*—Trygve M. Blix
*Assistant Examiner*—Reinhard J. Eisenzopf

[57] ABSTRACT

The automatic heading retention mode of operation of an automatic flight control system for a rotary wing aircraft is discontinued and reestablished through the use of a logic circuitry responsive to the yaw rate, bank angle and airspeed of the aircraft and to the force applied to the cyclic pitch control member by the pilot. The logic circuitry provides for the isolation of information commensurate with left and right turns and summation of the yaw rate and bank angle in each direction to determine if automatic disengagement of the heading hold is warranted.

13 Claims, 2 Drawing Figures

HEADING HOLD LOGIC

BACKGROUND OF THE INVENTION

1. Field of the Invention

The present invention relates to facilitating the exercise of control over aircraft and particularly rotary wing aircraft. More specifically, this invention is directed to means for automatically controlling the engagement and disengagement of the heading hold mode of an automatic flight control system. Accordingly, the general objects of the present invention are to provide novel and improved methods and apparatus of such character.

2. Description of the Prior Art

While not limited thereto in its utility, the present invention is particularly well suited for incorporation in an automatic flight control system for helicopters. When flying a helicopter a pilot must manipulate three separate control elements; i.e., the collective pitch stick, the cyclic pitch stick and the yaw pedals. Since a helicopter is an inherently unstable aircraft, manual flight control requires constant manipulation of these controls to maintain a predetermined attitude. Accordingly, to facilitate the operation thereof, automatic flight control systems for rotary wing aircraft have been devised. An early version of such an automatic flight control system is shown and described in U.S. Pat. No. 2,845,623.

Automatic flight control systems for helicopters include, in a yaw "channel", means for implementing a heading hold mode of operation. When in the heading hold mode the aircraft will fly "hands off" along a heading selected by the pilot. A heading hold mode of operation, and the apparatus which permits such operation, are well known in the art and will be briefly discussed below in the description of the preferred embodiment of the present invention.

When the aircraft is in automatic control mode, for example a heading hold mode, any deviations from the desired heading will be sensed and appropriate corrective action automatically taken. In order to insure rapid and accurate aircraft response to a pilot input when the automatic flight control systems is engaged, for example when an evasive maneuver is suddenly required, it is necessary that provision be made for disengagement of the automatic control or selected functional modes thereof. Such disengagement must be accomplished both automatically and quickly in order to insure that, when manual control is resumed, the automatic flight control system will not be resisting the input commands generated by the pilot. To this end, considering the heading hold mode of a helicopter automatic flight control system, sensor switches have customarily been provided on the yaw pedals. In order to assume manual control and disengage the heading hold mode, it was necessary for the pilot to place his feet on the yaw pedals thus actuating the pedal switches and thereby generating disengagement control signals. The employment of yaw pedal switches, however, required that the pilot have his feet on the pedals to make a turn and precluded the positioning of the pilot's feet on the yaw pedals during the automatic heading hold mode. The necessity for the pilot to reposition his feet in order to shift between the manual and automatic control modes resulted, among other disadvantages, in a time delay incident to the resumption of manual control.

As a further requirement of an automatic flight control system for rotary wing aircraft, it is necessary that the circuitry which supervises the automatic engagement and disengagement of the heading hold mode by capable of distinguishing between a pilot input and a sudden comparatively large magnitude attitude change such as might be incident to a wind gust. Thus, the aforementioned disadvantages incident to the employment of yaw pedal mounted switches can not be overcome merely by sensing the magnitude of an attitude change, such as a bank, since such attitude magnitude change sensing would be unable to discriminae between transient conditions, for which it is desired to compensate utilizing the heading hold control circuitry, and those conditions where the pilot wishes to disengage the heading hold control so as to execute a maneuver.

SUMMARY OF THE INVENTION

The present invention overcomes the above-described disadvantages of the prior art by providing a novel and improved technique for engaging and disengaging the automatic heading hold mode of operation of an aircraft flight control system and by providing apparatus for use in the practice of that novel techinque. In accordance with this invention, the heading hold mode of operation is automatically discontinued, and heading error signals thus isolated from the actuator portion of a flight control system, through the operation of a unique combination of logic circuit elements. The automatic disengagement of the heading hold mode will be accomplished when the sum of parameters corresponding to the actual bank angle and yaw rate exceed a predetermined minimum and the pilot is exercising some affirmative action such as, for example, applying a lateral force in excess of a predetermined minimum to the cyclic pitch stick. In accordance with a preferred embodiment, the heading hold mode will also be discontinued when a signal commensurate with a pilot initiated command is received from the cyclic pitch trim release switch or a roll trim switch; either of these signals operating in lieu of the signal commensurate with the force applied to the cyclic pitch stick to cause the desired discontinuance of the heading hold operative mode when the sum of the bank angle and yaw rate exceed the predetermined minimum. The input signals commensurate with a pilot commanded heading change, which are employed to disengage the heading hold mode of operation, are preferably generated separately for left and right turns. Also, the automatic disengagement of the heading hold operative mode will, in accordance with a preferred embodiment, be permitted to occur only when the forward component of airspeed of the aircraft is above a preselected minimum.

The present invention also contemplates the utilization of the previously employed yaw pedal switches to disengage the heading hold mode when the aircraft is operating at a forward speed below the preselected minimum whereby the pilot may assume total manual control below this preselected airspeed by placing his feet on the yaw control pedals.

In addition to the left and right turn logic isolation, and to the summation of the yaw rate and bank angle to disengage the heading hold mode in each turn direction, the present invention contemplates delaying the application of input signals commensurate with cyclic pitch stick force so as to insure that the system will be responsive to steady state input signals. Additionally, the cyclic pitch stick force, roll trim switch operation or cyclic pitch trim release signals are preferably delayed in the interest of imparting stability to the system. In order to accomplish trimming of the aircraft upon selection of a new heading, the removal of input signals derived from the roll trim switch may also be delayed.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
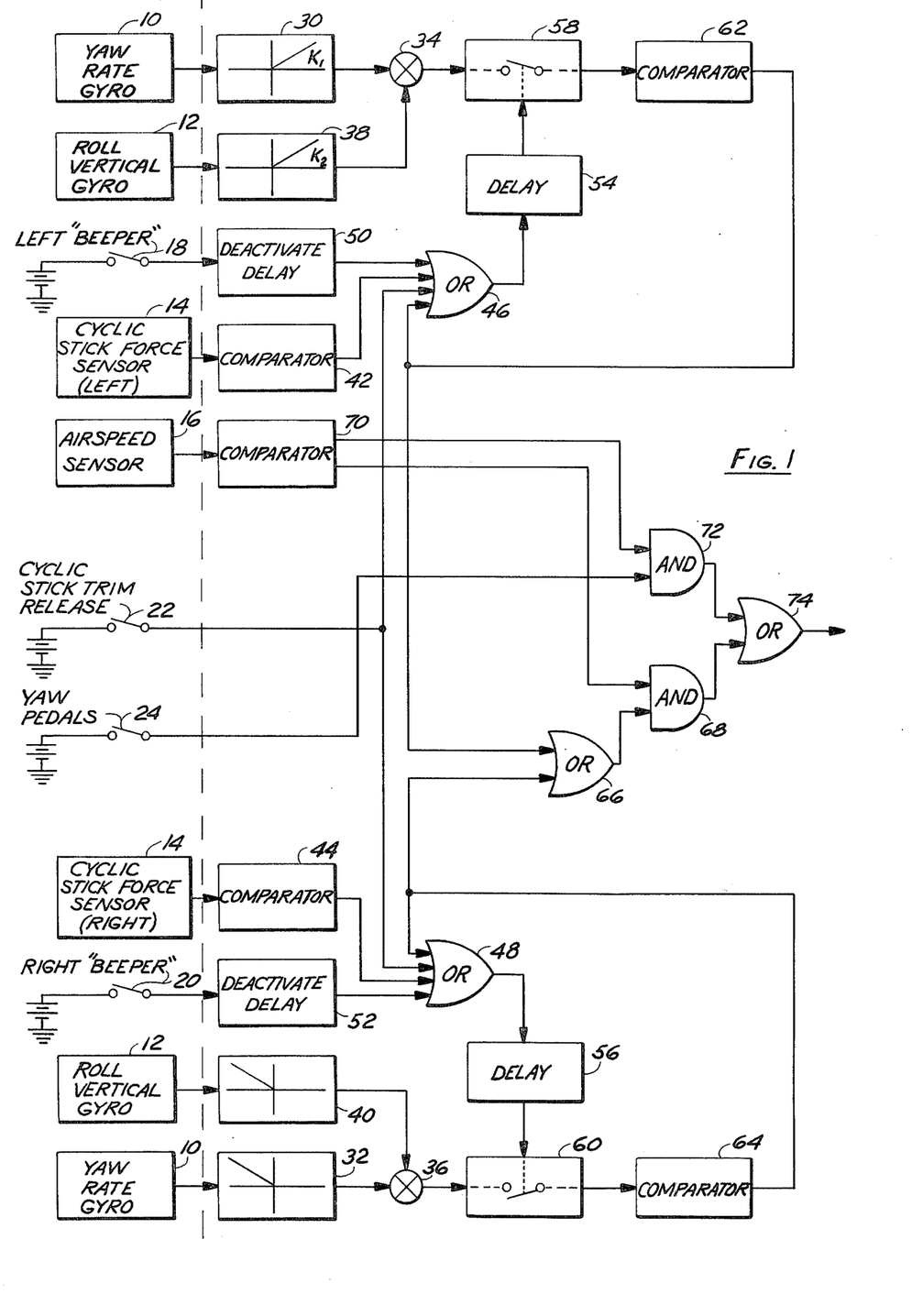
FIG. 1 is a functional block diagram of a preferred embodiment of heading hold engagement and disengagement control logic circuitry for incorporation in the yaw channel of an automatic flight control system.

With reference now to the drawing, means for accomplishing the automatic disengagement and reengagement of the automatic heading hold mode of operation of an automatic flight control system is depicted in functional block diagramm form in FIG. 1. As is well known in the art, the yaw channel of an automatic flight control systemm provides automatic heading retention and rate damping. For a somewhat more detailed description of a yaw channel of an automatic flight control system for rotary wing aircraft, reference may be had to copending application Ser. No. 649,331 of Ronald E. Barnum filed Jan. 15, 1976 and assigned to the assignee of the present invention.

A primary input to the flight control system yaw channel is derived from a directional gyro, not shown, which may be of the magnetically slaved type. The directional gyro or compass senses aircraft heading and, subsequent to selection of a desired heading, provides an output signal commensurate with heading error. In the heading hold mode of operation this error signal is delivered to a servo system wherein it is employed to maintain the aircraft on the desired heading; the control system operating to null the heading error signals.

The flight control system yaw channel also receives, as an input, rate of turn signals from a yaw gyro. These yaw turn rate signals are employed as inputs to the heading hold logic of the present invention. In order to facilitate understanding of the invention, the yaw rate gyro has been depicted at two places in FIG. 1 and identified by reference numeral 10. The yaw rate gyro 10 will sense the rate of heading change and provide a signal commensurate with both the direction and rate of aircraft yaw.

Additional inputs to the heading hold logic circuitry of FIG. 1 are derived from a roll vertical gyro 12, a cyclic pitch force sensor 14, and an airspeed sensor 16. As in the case of yaw rate gyro 10, roll vertical gyro 12 has been depicted at two places on FIG. 1. Similarly, the cyclic stick force sensor 14 has been indicated as two separate inputs since the force sensor is capable of discriminating between lateral stick forces applied to the left and right. Additional inputs to the heading hold logic are provided from left and right "beeper" switches 18 and 20 resprectively, which are provided for use by the pilot in trimming roll attitude, and a cyclic stick trim release switch 22, through which the pilot overcomes cyclic stick forces in order to provide manual control of the pitch and roll axes of the aircraft. The final inputs to the heading hold logic circuit consists of signals provided by the closing of the yaw pedal switches 24 and signals generated by the airspeed sensor 16 in conjunction with a comparator 70.

The yaw turn rate signals from yaw rate gyro 10 are applied to a pair of polarity sensitive circuits 30 and 32. As noted above, the magnitude and polarity of the output signals from yaw rate gyro 10 are indicative of the direction and rate of aircraft yaw; these signals being represented graphically within the circuits 30 and 32. The polarity sensitive circuit 30 will provide an output signal commensurate with the rate of yaw in a left-hand direction while the polarity sensitive circuit 32 will provide a signal commensurate with the rate of yaw in the righthand direction. The output signals from polarity sensitive circuits 30 and 32 are respectively applied to summing circuits 34 and 36.

The roll vertical gyro 12 will provide an output signal having a magnitude commensurate with the bank angle and a polarity corresponding to the direction of bank; i.e., left or right bank angle. The output signal from roll vertical gyro 12 is applied to a further pair of polarity sensitive circuits 38 and 40. The input signals to polarity sensitive circuits 38 and 40 from roll gyro 12 are graphically depicted within each of the circuits. The polarity sensitive circuit 38 will provide an output signal commensurate with the magnitude of bank angles to the left while the polarity sensitive circuit 40 will provide an output signal commensurate with the magnitude of bank angles to the right. The output signals provided by the polarity sensitive circuits 38 and 40 are respectively applied as second inputs to summing circuits 34 and 36.

Figure 2:
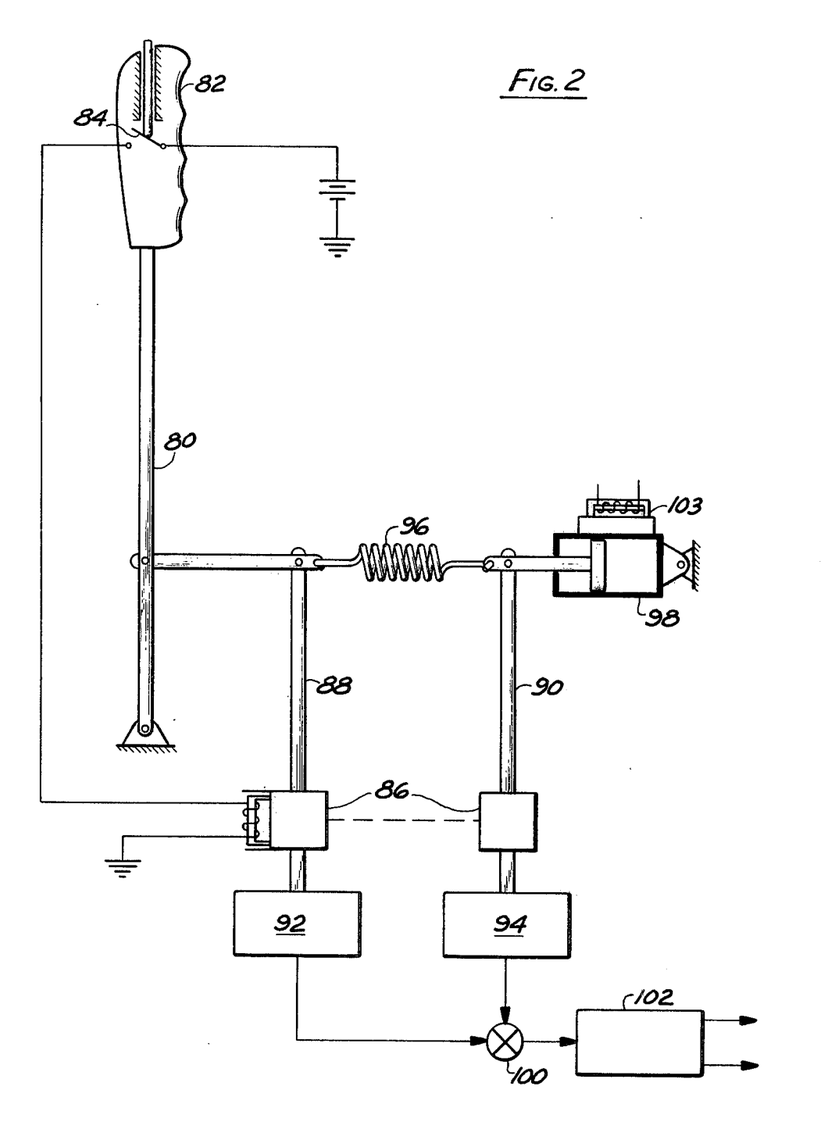
FIG. 2 is a schematic representation of control signal generating means associated with a cyclic pitch stick in accordance with the invention.

The cyclic stick force sensor, which will be described in greater detail below in the discussion of FIG. 2, provides input signals to a pair of level comparator circuits 42 and 44. Circuits 42 and 44, which may comprise operational summing amplifiers configured as level comparators and time delay, provide for the delayed passage, to the remainder of the heading hold logic, of signals commensurate with the application of pressure by the pilot to the cyclic pitch stick. There will, however, be no delay upon the "drop out" of the stick pressure. The output of comparator circuit 42, which is a signai commensurate with pressure applied in the left-hand direction to the cyclic pitch stick, is delivered to an OR gate 46; circuit 42 providing an output signal commensurate with a 1 or 0. Similarly, comparator circuit 44 provides an output signal, commensurate with the presence or absence of pressure applied to the cyclic pitch stick in the right-hand direction, to an OR gate 48. The delay imparted to the stick force signals by level comparator circuits 42 and 44 insures that the system will not respond to inputs of insufficient duration to cause an aircraft heading change.

Second inputs to each of OR gates 46 and 48 are provided by the cyclic stick trim release switch 22. As noted above, the pilot will operate trim release switch 22 when manual control is desired thus releasing the attitude hold logic.

Third inputs to each of OR gates 46 and 48 will respectively be derived from beeper switches 18 and 20. Switches 18 and 20 are roll trim switches which are operated by the pilot, in the manner known in the art, to make single axis attitude changes. Signals commensurate with the closing of switches 18 and 20 are respectively applied to the associated OR gate through either of delayed deactivation circuits 50 and 52. Circuits 50 and 52 provide for the immediate application of signals commensurate with the closing of switches 18 and 20 on their respective OR gates but delay the drop out of the signals upon the opening of the beeper switches. The delayed drop out is incorporated in the system to allow sufficient time for the aircraft to establish a trimmed bank angle and turn rate; this being brought about by the autopilot roll attitude hold function after the roll attitude reference has been displaced by beeping action.

The final input to both of OR gates 46 and 48 is a signal, generated in the manner to be described below, indicative of the existence of conditions which warrant the disengagement of the heading hold mode of operation. This fourth input signal to each of OR gates 46 and 48 thus, also in the manner to be described, functions to logically "lock" out the heading retention function of an automatic flight control system in the disengaged condition until such time as the yaw rate and bank angle signals have decayed to a level indicative of a return to a straight flight path.

The signals passed by OR gates 46 and 48 are respectively delivered, via delay circuits 54 and 56, to respective switching circuits 58 and 60; switches 58 and 60 respectively being the left and right turn switches. The delay circuits 54 and 56 are incorporated in the system to reduce the susceptibility of the logic circuitry to noise. Considering the left turn logic only, the sum of the yaw rate and bank angle signals, as appears at the output of summing circuit 34, will be passed by switch 58 to a comparator 62 when switch 58 is in the closed condition. Switch 58 will, as will be apparent from the discussion above, be closed when pressure in excess of a predetermined minimum is laterally applied, in the left-hand direction, to the cyclic pitch stick for a period of time in excess of the delay established by level comparator circuit 42 or when either of the left beeper switch 18 or cyclic stick trim release switch 22 has been closed by the pilot. Thus, switch 58 will be closed in response to some positive action on the part of the pilot and, upon the closing of the switch, the summation of signals commensurate with the yaw rate and bank angle will be delivered to comparator 62. Comparator 62, which may be an operational amplifier level detector, will compare the input signal delivered thereto from summing circuit 34 with a preselected bias and will provide an output signal if the sum of the yaw rate and bank angle exceeds a predetermined minimum level. Comparator 62 thus provides, at its output terminal, either a 1 or a 0 respectively indicative of the necessity of disengaging the heading hold operational mode or the lack of need for any action to disrupt the existing operational state. A comparator 64 in the right-hand logic performs the same function as comparator 62 with respect to left turns. As noted above, the outputs of comparators 62 and 64 are respectively delivered to OR gates 46 and 48 to cause the latching of switches 58 and 60 in the closed position. The outputs of comparators 62 and 64 are also applied as the inputs to a further OR gate 66.

Signals passed by OR gate 66, indicative of the existence of conditions which require the disengagement of the heading hold operational mode of an automatic flight control system, are delivered as a first input to AND gate 68. The second input to AND gate 68 is a signal, in the form of a 1 or 0, indicative of whether the forward airspeed of the aircraft is above or below a preselected level. The binary signal indicative of airspeed is generated by a comparator 70 which may comprise an operational amplifier level detector, if the signal sensed is a voltage proportional to airspeed, or simply a set of electrical contacts connected to a bellows sensing the difference between dynamic and static pressure and closing at a predetermined pressure. Comparator 70 receives, as its input, an analog signal as provided by the airspeed sensor 16. The output stage of comparator 70 comprises a bistable circuit whereby a 1 will be delivered to AND gate 68 when the airspeed is above the preselected minimum value and a 1 will be delivered to a further AND gate 72 when the airspeed is below the preselected level. In a typical example the minimum airspeed will be 60 knots. When the aircraft is operating above 60 knots and either of comparators 62 and 64 is providing an output signal both inputs to AND gate 68 are in the positive or 1 state and gate 68 will provide a signal to OR gate 74. This signal will be passed by gate 74 and will operate, in the manner known in the art, to disengage the heading hold operational mode. The disengagement may be accomplished by providing the output of OR gate 74 to a yaw synchronizer to cause the synchronizer to switch to the "synchronized" condition. With the yaw synchronizer, which is a subsystem employed in prior art heading hold controls, in the synchronized state the output of the directional gyro will be employed to position the rotor of a control transformer within the synchronizer so as to hull the transformer output. During the time the synchronizer is being internally nulled, there will be no directional error signal delivered to the servo system coupled to the controlled autopilot mechanism. When the synchronizing signal from OR gate 74 is removed from the yaw synchronizer, the internal control transformer output will be in a nulled state and a new heading reference will have been established. The automatic control system will now use this new heading reference to guide the aircraft.

In accordance with the disclosed embodiment of the present invention, at airspeeds below the preselected minimum value, the heading hold operational mode will be terminated only when the pilot places his feet on the yaw pedals. This action on the part of the pilot closes the yaw pedal switches 24 thereby delivering a second input to AND gate 72. This second input, with the airspeed below the preselected minimum value, will be delivered to OR gate 74 and thence to the yaw synchronizer. Thus, the disengagement of the heading hold mode of operation at airspeeds below the preselected minimum value will be accomplished when the pilot places his feet on the yaw pedals. This manner of operation is desirable because, during low speed or hovering flight in a helicopter, heading changes are not accomplished by establishing roll bank angles but by yawing the heading with the tail rotor control via the pedals.

Referring now to FIG. 2, a cyclic pitch stick is depicted schematically at 80. Stick 80 includes, mounted in the handle portion 82 thereof, a cyclic trim release switch 84; switchh 84 controlling among other functions the engagement and disengagement of a solenoid operated clutch 86. The clutch 86 has been shown in two sections to facilitate understanding of the invention. Clutch 86, when in the normally engaged condition, serves to couple the movements of a pair of shafts 88 and 90 respectively to transducers 92 and 94. Transducers 92 and 94, in a preferred embodiment, comprise AC linear transducers. The current supply for transducers 92 and 94 has been omitted from the drawing. Shaft 88 is directly coupled to the cyclic pitch stick 80 while shaft 90 is coupled to stick 80 via a spring 96. Shaft 90 is directly coupled to the piston of a hydraulic stick trim actuator 98; pressurized fluid delivered to actuator 98 under the control of an electrohydraulic servo valve 102 positioning the piston as a function of the roll control stick trim requirements. The output of transducer 94, which is a trim position transducer, is applied as a first input to a summing circuit 100. The output of transducer 92, which is the control position transducer, is delivered as the second input to summing circuit 100. The outputs of transducers 92 and 94, which will be of opposite polarity, result from defluctions of the spring 96 caused by the application of force to the control stick 80. The output of summing circut 100 is delivered to a comparator 102. Comparator 102 may comprise an operational amplifier with a preset trip level. In the manner to be described below, comparator 102 will provide a pair of output signals resprectively commensurate with whether the force applied to the cyclic pitch stick is in the left or right-hand direction. Thus, elements 84–100 of FIG. 2 correspond to the cyclic stick force sensor 14 of FIG. 1 while comparator 102 is in fact equivalent to the level comparator circuits 42 and 44 of FIG. 1.

The operation of the cyclic stick force sensor of FIG. 2 is as follows: The force sensor produces an output by sensing the difference in output motions of transducers 92 and 94. There will be no output if the motions are equal which must be the case when the spring 96 is not compressed. Any commpression of spring 96 will be reflected as a difference in motion of transducers 92 and 94 and an output proportionate to force will thus be generated. The clutch 86 provides a means for initializing to various flight trim positions and giving transducers 92 and 94 a new nulled output position thus reducing system error stackup.

As should now be obvious to those skilled in the art, the present invention comprises novel and improved heading hold logic which functions to control the disengagement and engagement of the heading hold mode of an automatic flight control system. In accordance with the disclosed embodiment of the invention, heading hold is disengaged by yaw pedal switches at low speeds, where the pedals are customarily employed to control heading, and by the lateral force applied to the cyclic pitch stick or the operation by the pilot of the cyclic trim release switch or bank angle beeper switches at high speeds, where lateral cyclic inputs control heading. The invention contemplates the employment of time delays to reduce the susceptiblility of the control to noise and to eliminate transients. The present invention is characterized by left and right turn logic isolation and by summation of the yaw rate and bank angle to determine if automatic disengagement of the heading hold is warranted.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In an aircraft automatic flight control system, the flight control system having a yaw channel with the capability of automatically holding the aircraft on a desired heading, the flight control system receiving aircraft status input information commensurate with attitude, speed and rate of change of heading and the yaw channel generating and applying control signals to an actuator coupled to a device for varying the heading of the aircraft in order to maintain the desired heading, the flight control system further having means for interrupting the heading hold functional mode of operation of the yaw channel, the improvement comprising:
    means responsive to information commensurate with the status of the aircraft with respect to at least a first axis for generating a first deviation signal when the aircraft deviates from the desired relationship to the said axis;
    means responsive to a manually produced input for generating a first enabling signal;
    means responsive to information commensurate with the airspeed of the aircraft for generating a second enabling signal, said second enabling signal being indicative of the aircraft traveling at a forward speed in excess of a predetermined minimum;
    means responsive to said first deviation signal and said first enabling signal for generating a first heading hold interrupt command signal indicative of deviation of the aircraft from the desired relationship to said axis in excess of a predetermined magnitude; and
    means responsive to said first interrupt command signal and said second enabling signal for transmitting said first interrupt command signal to the flight control system yaw channel heading hold function interrupt means to cause automatic discontinuance of the heading hold mode of automatic control.

2. The apparatus of claim 1 wherein said means for generating said first deviation signal comprises:
    means responsive to input signals commensurate with the rate of change of heading and to the attitude of the aircraft for providing an output signal commensurate with the sum of the heading change rate and attitude with respect to horizontal.

3. The apparatus of claim 1 wherein said aircraft is of the rotary wing type having means for cyclically varying the pitch of the rotary wing and wherein said means for generating the first enabling signal comprises:
    first for sensing the force applied to the cyclic pitch control mechanism and generating a signal commensurate therewith;
    means responsive to said signal commensurate with cyclic pitch control mechanism applied force for generating a force related command signal when said force exceeds a predetermined minimum; and
    means applying said force related command signal to said first heading hold interrupt command signal generating means.

4. The apparatus of claim 3 wherein said means for generating said first deviation signal comprises:
    means responsive to input signals commensurate with the rate of change of heading and to the attitude of the aircraft for providing an output signal commensurate with the sum of the heading change rate and attitude with respect to horizontal.

5. The apparatus of claim 4 wherein said first enabling signal generating means further comprises:

means for sensing roll attitude trim commands and generating signals commensurate therewith;

means for sensing cyclic pitch trim release commands and generating signals commensurate therewith; and means responsive to said signals commensurate with roll attitude trim commands, cyclic pitch trim release commands and cyclic pitch control mechanism applied force for generating said first enabling signal when one of said signals is present, said first enabling signal being delivered to said first interrupt command signal generating means by said applying means.

6. The apparatus of claim 4 wherein the aircraft yaw is controllable through the operation of yaw pedals and wherein said improvement further comprises:

yaw pedal mounted foot pressure sensor switches;

second means responsive to information commensurate with the airspeed of aircraft for generating a third enabling signal indicative of forward airspeed less than said predetermined minimum;

means responsive to the operation of said yaw pedal mounted switches and to said third enabling signal for generating a second heading hold interrupt command signal; and means responsive to said first and second heading hold interrupt command signals for delivering either of said interrupt signals to the automatic flight control yaw channel heading hold function interrupt means.

7. The apparatus of claim 4 wherein said applying means includes:

means for delaying application of said force related command signal to said heading hold interrupt command signal generating means.

8. The apparatus of claim 6 wherein said applying means includes:

means for delaying application of said first enabling signal to said heading hold interrupt command signal generating means.

9. In an automatic flight control system for a helicopter, the helicopter having means for cyclically varying the pitch of a main rotor and the flight control system having a yaw channel with the capability of automatically holding the helicopter on a desired heading, the flight control system receiving input signals comensurate with airspeed, bank angle and yaw rate and the yaw channel generating and applying control signals to an actuator to vary the heading of the helicopter in order to maintain the desired heading, the flight control system further having means for interrupting the heading hold functional mode of operation of the yaw channel, the improvement comprising:

means responsive to input signals commensurate with yaw rate to the left of the desired course and left bank angle for generating a first deviation signal;

means responsive to input signals commensurate with yaw rate to the right of the desired course and right bank angle for generating a second deviation signal;

means for sensing the magnitude and direction of force applied to the cyclic pitch control means and generating first and second enabling signals respectively commensurate with manually generated cyclic pitch commands in excess of a predetermined magnitude in the left and right directions;

means responsive to input signals commensurate with the airspeed of the aircraft for generating third and fourth enabling signals, said third and fourth enabling signals being respectively indicative of the aircraft traveling at a forward speed in excess of and less than a predetermined speed;

means responsive to said first deviation signal and said first enabling signal for generating a first heading hold interrupt command signal;

means responsive to said second deviation signal and said second enabling signal for generating a second heading hold interrupt command signal;

logic circuit means responsive to said first and second interrupt command signals and to said third enabling signal for passing either of said first or second enabling signals;

yaw pedal mounted foot pressure sensor switches;

means responsive to the operation of said yaw pedal mounted switches and to said fourth enabling signal for generating a third heading hold interrupt command signal;

means responsive to either of said first and second heading hold interrupt command signals passed by said logic circuit means and to said third heading hold interrupt command signal for delivering any of said interrupt signals to the automatic flight control system yaw channel heading hold function interrupt means.

10. The apparatus of claim 9 wherein said means for generating said first and second deviation signals each comprise:

first polarity sensitive circuit means responsive to a yaw rate input signal for generating an output signal commensurate with the magnitude of the yaw rate in a first direction;

second polarity sensitive circuit means responsive to an input signal commensurate with bank angle for generating an output signal commensurate with the magnitude of the bank angle in a first direction; and means for summing said output signals commensurate with yaw rate and bank angle in a first direction to provide a deviation signal.

11. The apparatus of claim 10 wherein said means for generating said first and second heading hold interrupt command signals each comprises:

comparator means responsive to applied signals commensurate with the sum of yaw rate and bank angle for passing deviation signals having a magnitude greater than a predetermined minimum;

normally open switch means for coupling deviation signals from said summing circuit means to said comparator means, said switch means being responsive to an applied enabling signal; and means for delaying the application of the enabling signal to said switch means.

12. In a method for exercising control over the flight of a rotary wind aircraft, the aircraft having an automatic flight control system capable of maintaining a preselected flight heading, an improved technique for discontinuance of the automatic heading hold mode of operation comprising:

sensing the yaw rate of the aircraft with respect to the heading being maintained by the automatic flight control system;

sensing the bank angle of the aircraft;

sensing the pilot applied force to the control member employed to generate a rotary wing cyclic pitch control command;

sensing the airspeed of the aircraft;

interruptubg the heading hold functional mode of the automatic flight control system when the sum of the sensed yaw rate and bank angle in either direction exceeds a predetermined minimum, the force applied to the cyclic pitch control member in the same direction exceeds a predetermined minimum and the airspeed exceeds a predetermined minimum.

13. The method of claim 12 wherein the aircraft is provided with yaw pedals through which the pilot generates heading change commands and wherein said method further comprises:
sensing the presence of the pilot's feet on the yaw pedals; and
additionally interrupting the heading hold mode of operation of the automatic flight control systemm when the pilot's feet are on the yaw pedals and the airspeed is less than the predetermined minimum.

* * * * *

UNITED STATES PATENT AND TRADEMARK OFFICE
CERTIFICATE OF CORRECTION

PATENT NO. : 4,003,532
DATED : January 18, 1977
INVENTOR(S) : Don L. Adams, Sr. et al It is certified that error appears in the above-identified patent and that said Letters Patent are hereby corrected as shown below:

Column 2, line 4, change "by" to --be--

Column 2, line 9, before "switches" insert --sensor--

Column 2, line 12, change "discriminae" to --discriminate--

Column 3, line 30, change "diagramm" to --diagram--

Column 3, line 32, change "systemm" to --system--

Column 4, line 1, "resprectively" should be --respectively--

Column 5, line 8, change "on" to --to--

Column 5, line 55, change "respecitively" to --respectively--

Column 6, line 34, change "hull" to --null--

Column 6, line 65, change "switchh" to --switch--

Column 7, line 26, change "prectively" to --pectively--

Column 7, line 37, change "commpression" to --compression--

Column 7, line 58, before "transients" insert --engagement--

Column 8, line 50, (claim 3, line 5) change "first" to --means--

UNITED STATES PATENT AND TRADEMARK OFFICE
CERTIFICATE OF CORRECTION

PATENT NO. : 4,003,532
DATED : January 18, 1977
INVENTOR(S) : Don L. Adams, Sr. et al It is certified that error appears in the above-identified patent and that said Letters Patent are hereby corrected as shown below:

Column 9, line 46, (claim 9, line 6) change "comensu" to --commensu--

Column 10, line 56, (claim 12, line 21) change "wind" to --wing--

Column 12, line 8, (claim 13, line 8) change "systemm" to --system--

Signed and Sealed this

Nineteenth Day of April 1977

[SEAL]

Attest:

RUTH C. MASON
*Attesting Officer*

C. MARSHALL DANN
*Commissioner of Patents and Trademarks*